United States Patent [19]
Maeno et al.

[11] Patent Number: 5,054,069
[45] Date of Patent: Oct. 1, 1991

[54] APPARATUS FOR SCRAMBLING/DESCRAMBLING DATA BY WORD-BY-WORD PROCESSING

[75] Inventors: Takahiro Maeno; Yasunori Sato, both of Tokyo, Japan

[73] Assignee: Oki Electric Industry Co., Ltd., Tokyo, Japan

[21] Appl. No.: 574,147

[22] Filed: Aug. 28, 1990

Related U.S. Application Data

[63] Continuation-in-part of Ser. No. 491,067, Mar. 9, 1990, abandoned.

Foreign Application Priority Data

Mar. 9, 1989 [JP] Japan .................. 1-54900
Mar. 8, 1990 [JP] Japan .................. 2-54850

[51] Int. Cl.$^5$ .................................. H04L 9/00
[52] U.S. Cl. ............................ 380/50; 380/49
[58] Field of Search .................... 380/49, 50

[56] References Cited

U.S. PATENT DOCUMENTS

| | | | |
|---|---|---|---|
| 4,771,462 | 9/1988 | Hannan et al. | 380/50 |
| 4,907,271 | 3/1990 | Gilham | 380/50 |
| 5,911,216 | 10/1975 | Bartek et al. | 380/50 |

OTHER PUBLICATIONS

"Data Communication Over The Telephone Network" CCITT, V8 Recommendations of the V series VIIIth Plenary Session 8-19 Oct. 1984 pp. 170-198.

Primary Examiner—Thomas H. Tarcza
Assistant Examiner—David Cain
Attorney, Agent, or Firm—Spencer & Frank

[57] ABSTRACT

A scrambling/descrambling apparatus has a data memory for storing a data word, a bit invert flag, and numerical data. A bit shift operating section performs, on receiving a bit of data to be outputted or a bit of input data, a bit shift operation with that bit and stores resultant data in the data memory in the form of a first data word. A randomizing/derandomizing section randomizes or derandomizes the input data by using the first data word and based on a generating polynomial and, depending on a state represented by the bit invert flag, inverts the bit of the data to be outputted to develop output data. A count processing section increments or decrements the numerical value stored in the data memory and, depending on the numerical value, selectively sets the bit invert flag to a predetermined state. A count controlling section replaces the numerical value with a predetermined initial value on the basis of the first data word and bit invert flag. The data memory holds a second and a third data word, bits of which corresponding in position to a particular bit of the first data word are a ZERO and a ONE, respectively. The count controlling section reads selectively either one of the second and third data words out of the data memory depending on the value of the bit which is inputted to the bit shift operating section, Exclusive-ORs the data word read out and the first data word, performs a masking operation with a data word resulting from the Exclusive-ORing for validating a bit corresponding in position to the particular bit position of the first data word while invalidating the remaining bits, and replaces the numerical value with the initial value when a data word resulting from the masking operation is indicative of a ZERO or when the bit invert flag is in the predetermined state. Alternatively, the count controlling section may read the first data word out of the data memory and, depending on the value of the bit which is inputted to the bit shift operating section, NOT or transfer the first data word, performs a masking operation with a data word representative of a result of NOTing or that of transfer for validating a bit corresponding in position to the particular bit position of the first data word while invalidating the remaining bits, and replace the numerical value with the initial value when a data word resulting from the masking operation is indicative of a ZERO or when the bit invert flag is in the predetermined state.

24 Claims, 7 Drawing Sheets

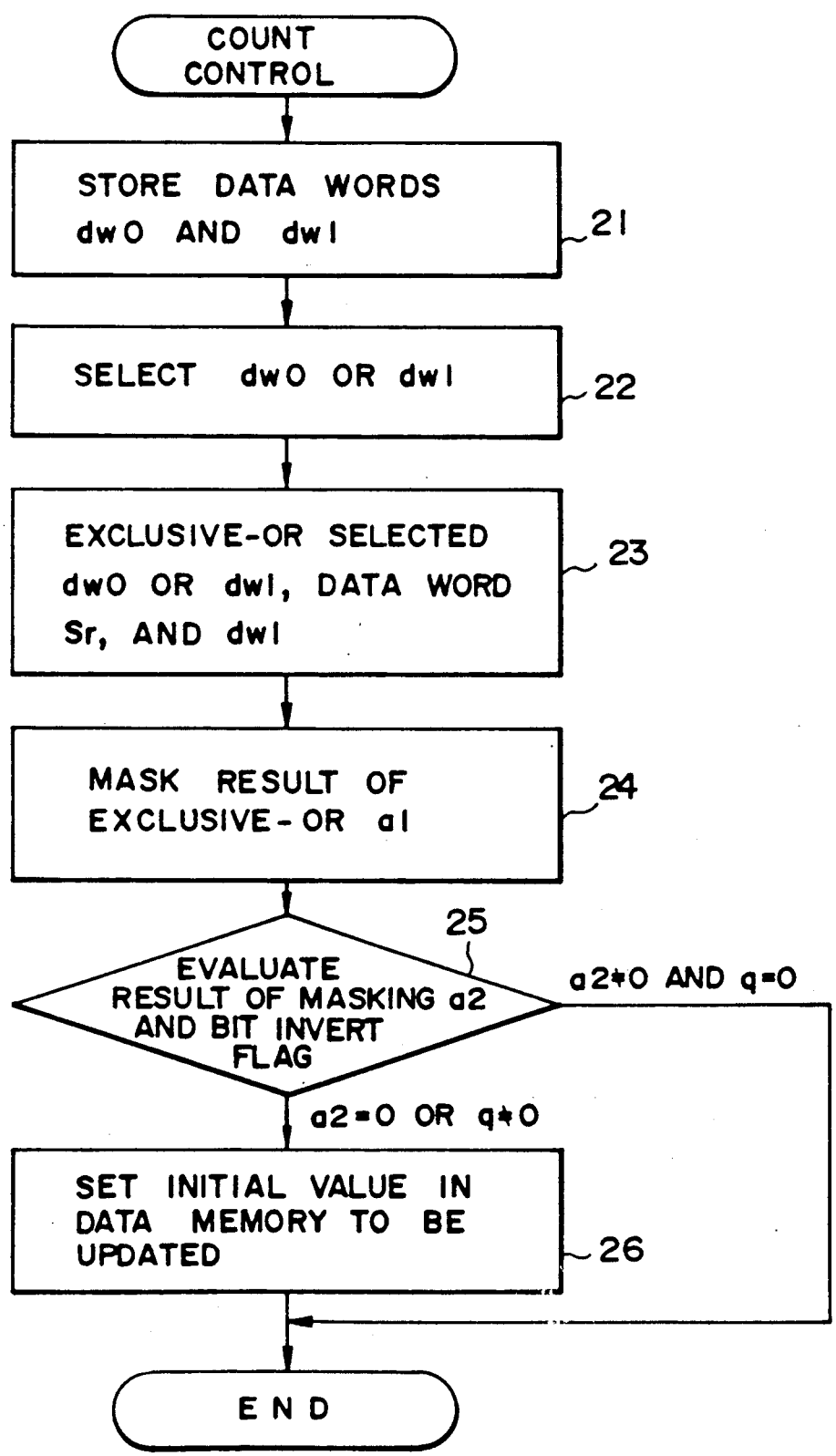

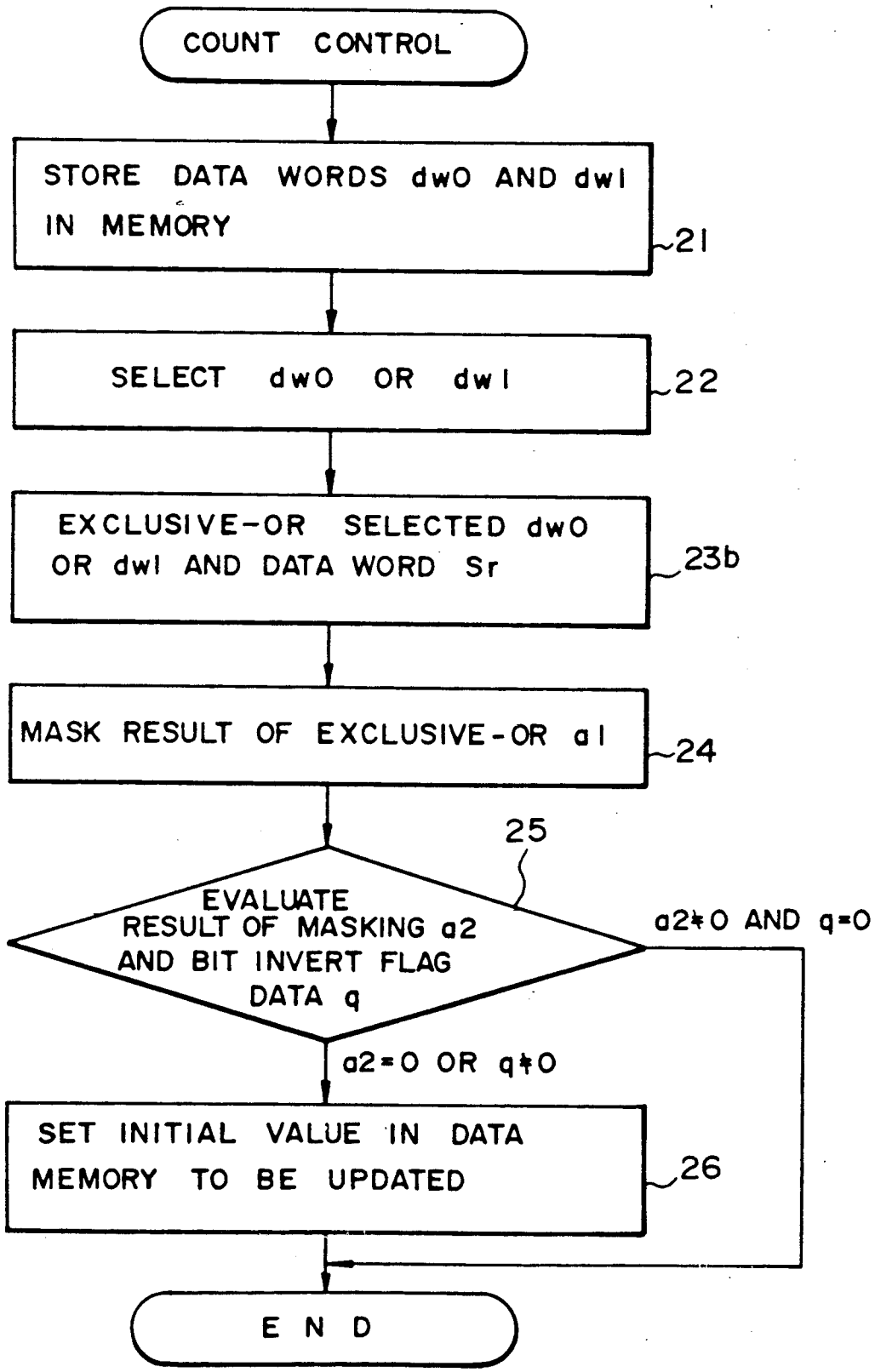

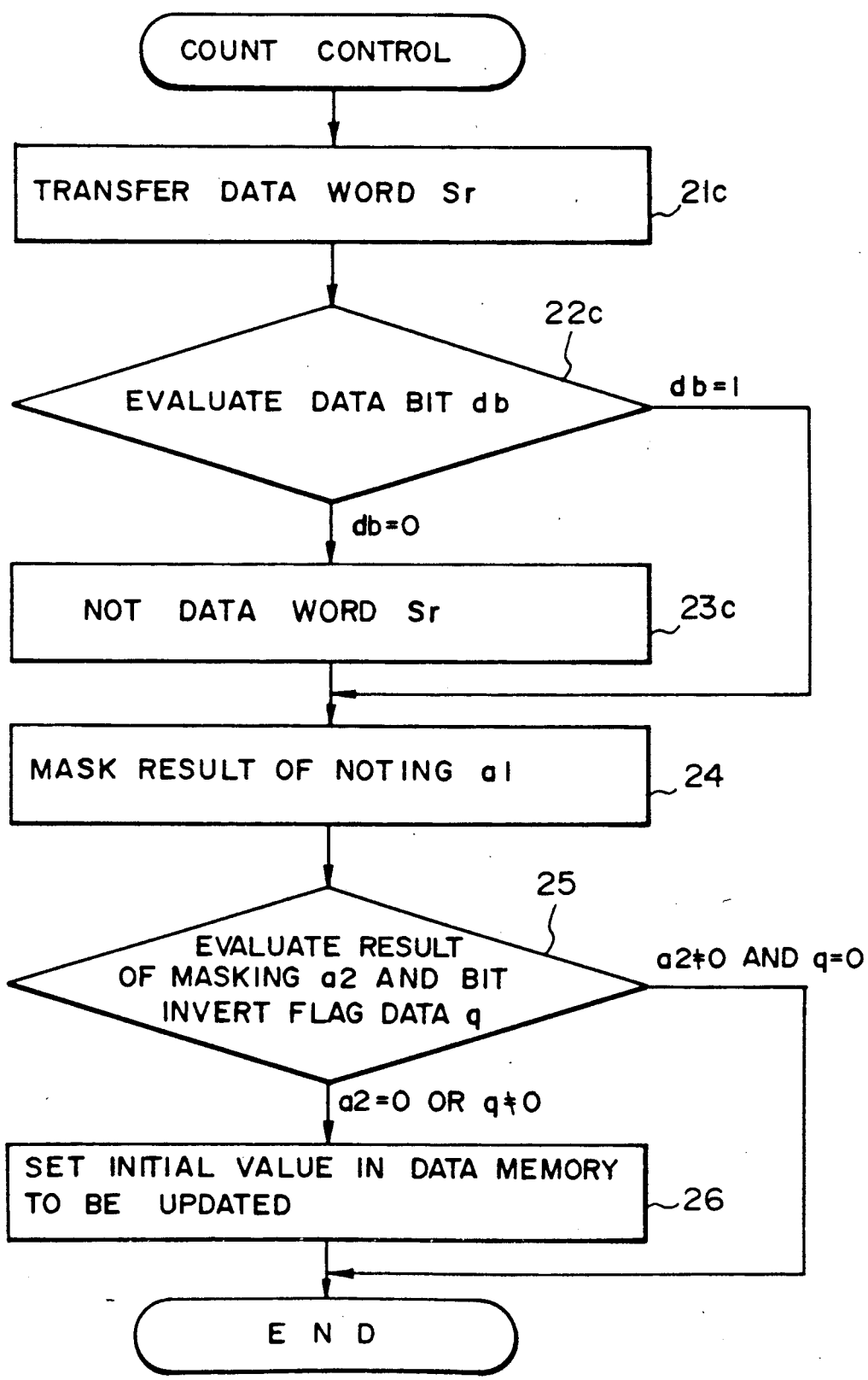

FIG. 4A

| B15 | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|
| x | x | x | 0 | x | x | 0 | 0 | x | x | x | x | x | x | x | x | dw0

FIG. 4B

| B15 | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|
| x | x | x | 1 | x | x | 1 | 1 | x | x | x | x | x | x | x | x | dw1

FIG. 4C

| B15 | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|
| a115 | a114 | a113 | a112 | a111 | a110 | a109 | a108 | a107 | a106 | a105 | a104 | a103 | a102 | a101 | a100 | a1

FIG. 4D

| B15 | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|
| 0 | 0 | 0 | 1 | 0 | 0 | 1 | 1 | 0 | 0 | 0 | 0 | 0 | 0 | 0 | 0 |

Mask

FIG. 4E

| B15 | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|
| 0 | 0 | 0 | a212 | 0 | 0 | a209 | a208 | 0 | 0 | 0 | 0 | 0 | 0 | 0 | 0 | a2

APPARATUS FOR SCRAMBLING/DESCRAMBLING DATA BY WORD-BY-WORD PROCESSING

This is a continuation-in-part of application Ser. No. 07/491,067 filed March 9, 1990 now abandoned.

BACKGROUND OF THE INVENTION

1. Field of the Invention

The present invention relates to a scrambler/descrambler for use in a modulator/demodulator (modem) which is applicable data communication using a telephone network.

2. Description of the Prior Art

In a modem for implementing data communication over a telephone network, a transmit and a receive section have a so-called scrambler and a descrambler, respectively. This is especially true with a modem of the type adopting a particular phase modulation system which is prescribed by CCITT (Comité Consulatif International Télégraphique et Téléphonique) Recommendations V.27, V.27bis, V.27ter, etc. A scrambler plays the role of a circuit for randomizing an input signal by a generating polynomial, and preventing codes having relatively short periods ascribable to the nature of a generating polynomial from repeating without being randomized. On the other hand, a descrambler executes a procedure inverse to the randomization which uses a generating polynomial and invalidates the protection against the repetition of codes having relatively short periods as effected by the scrambler, thereby reconstructing the signal.

One of scrambler/descramblers heretofore proposed is implemented by a shift register, a scrambler/descrambler circuit, and a monitor circuit. The monitor circuit is constituted by a counter and a counter control for controlling the counter. While a control output of the counter control is fed to the counter, it is provided with a time delay particular to the propagation path. A clock generator delivers a stepping clock to the counter and is made up of an oscillator and a frequency divider, for example. The scrambler/descrambler circuit has a switch in a data output circuit thereof which is connected to the shift register. The switch is caused into connection with the scrambling side when the apparatus functions as a transmitter or into connection with the descrambling side when the latter functions as a receiver.

The shift register and scrambler/descrambler circuit produces a random code whose period corresponds to 127 bits or decodes such a random code by using a generating polynomial $1+x^{-6}+x^{-7}$. The monitor circuit plays the role of a protection circuit for preventing codes having relatively short periods from occurring continuously without being randomized due to the nature of the generating polynomial. Specifically, the monitor circuit inverts the output bits of the scrambler/descrambler circuit when codes whose periods extend to 1-bit, 3-bit and 9-bit periods have occurred continuously for the period of 42 successive bits or when codes whose periods correspond to 2 bits, 4 bits, 6 bits and 12 bits have repeated for the period of 45 successive bits, in association with the ninth and twelfth bit positions of the shift register.

Since the prior art scrambler/descrambler involves bit-by-bit operations as stated above, it cannot be implemented by a processor. In the state of art, despite that a majority of the functions assigned to a modem is executed by a processor, the scrambler/descrambler relies on exclusive hardware in the form of a logical circuit which is independent of the processor. This requires an extra area and extra cost for installing the exclusive hardware. Concerning the processor, the hardware resource, i.e., the time over which the processor can be used and the area which the processor occupies are not efficiently used.

SUMMARY OF THE INVENTION

It is therefore an object of the present invention to provide a scrambler/descrambler capable of executing scrambling or descrambling processing word by word which is the basic unit of processor operations.

In one aspect of the present invention, a scrambling/descrambling apparatus for scrambling/descrambling input data to produce output data comprises a data memory for storing a data word, a bit invert flag, and numerical data, a bit shift operating section for performing, on receiving a bit of data to be outputted or a bit of input data, a bit shift operation with that bit and storing resultant data in the data memory in the form of a first data word, a randomizing/derandomizing section for randomizing or derandomizing the input data by using the first data word and based on a generating polynomial and, depending on a state represented by the bit invert flag, inverting the bit of the data to be outputted to develop output data, a count processing section for incrementing or decrementing the numerical value stored in the data memory and, depending on the numerical value, selectively setting the bit invert flag to a predetermined state, and a count controlling section for replacing the numerical value with a predetermined initial value on the basis of the first data word and the bit invert flag. The data memory holds a second and a third data word, bits of which corresponding in position to a particular bit of the first data word are a ZERO and a ONE, respectively. The count controlling section reads selectively either one of the second and third data words out of the data memory depending on the value of the bit which is inputted to the bit shift operating section, Exclusive-ORs the data word read out and the first data word, performs a masking operation with a data word (a1) resulting from the Exclusive-ORing for validating a bit corresponding in position to the particular bit position of the first data word while invalidating the remaining bits, and replaces the numerical value with the initial value when a data word (a2) resulting from the masking operation is indicative of a ZERO or when the bit invert flag is in the predetermined state.

In accordance with the present invention, the data memory is loaded with a second and a third data word which have respectively a ZERO and a ONE at their data bits corresponding in position to particular data bits of a first data word representative of the result of a bit shift operation, e.g., the eighth, ninth and twelfth bits. Then, the value of a data bit db inputted next in the bit shift operation is evaluated. If the value is a ZERO, the third and first data words are Exclusive-ORed; if it is a ONE, the second and first data words are Exclusive-ORed. This is followed by a masking operation for validating, among the bit sequence resulting from the Exclusive-ORing, the data bits corresponding to the eighth, ninth and twelfth bits while invalidating the other data bits.

In another aspect of the present invention, a scrambling/descrambling apparatus for scrambling/descrambling input data to produce output data comprises a data memory for storing a data word, a bit invert flag, and numerical data, a bit shift operating section for performing, on receiving a bit of data to be outputted or a bit of input data, a bit shift operation with that bit and storing resultant data in the data memory in the form of a first data word, a randomizing/derandomizing section for randomizing or derandomizing the input data by using the first data word and based on a generating polynomial and, depending on a state represented by the bit invert flag, inverting the bit of the data to be outputted to develop output data, a count processing section for incrementing or decrementing the numerical value stored in the data memory and, depending on the numerical value, selectively setting the bit invert flag to a predetermined state, and a count controlling section for replacing the numerical value with a predetermined initial value on the basis of the first data word and the bit invert flag. The data memory holds the first data word. The count controlling section reads first data word out of the data memory and, depending on the value of the bit which is inputted to the bit shift operating section, NOTing or transferring the first data word, performs a masking operation with a data word (a1) representative of a result of the NOTing or the transfer for validating a bit corresponding in position to the particular bit position of the first data word while invalidating the remaining bits, and replaces the numerical value with the initial value when a data word (a2) resulting from the masking operation is indicative of a ZERO or when the bit invert flag is in the predetermined state.

Further, in accordance with the present invention, the value of a data bit db inputted next in the bit shift operation is evaluated. If the value is a ZERO, the first data word is NOTed; if it is a ONE, the first data word is transferred. This is followed by a masking operation for validating, among the bit sequence resultant from the NOTing or the transfer, the data bits corresponding to the eighth, ninth and twelfth bits while invalidating the other data bits.

Thus, in accordance with the present invention, the content of the data representative of the result of the masking operation will be a ZERO when none of the values of the eighth, ninth and twelfth data bits of the first data word coincides with the data bits db, or it will not be a ZERO when at least one of the former coincides with the latter. Subsequently, if either one of the content of a bit invert flag stored in the data memory and the data word representative of the result of the masking operation is in a predetermined state, the numerical value stored in the data memory is replaced with an initial value. The predetermined state includes a state wherein the content of the data word representative of the result of the masking operation is a ZERO or the content of the bit invert flag is TRUE, and only in this state the numerical value is replaced with the initial value. The procedure described above is executed by word-by-word operations which do not involve bit shift operation processing.

BRIEF DESCRIPTION OF THE DRAWINGS

The objects and features of the present invention will become more apparent from the consideration of the following detailed description taken in conjunction with the accompanying drawings in which:

FIGS. 2A through 2C are flowcharts each demonstrating a specific operation of the illustrative embodiment for executing count control processing;

FIGS. 4A through 4E depict examples of a data word, mask pattern and result of operation available wit the illustrative embodiment.

DESCRIPTION OF THE PREFERRED EMBODIMENT

Figure 5:
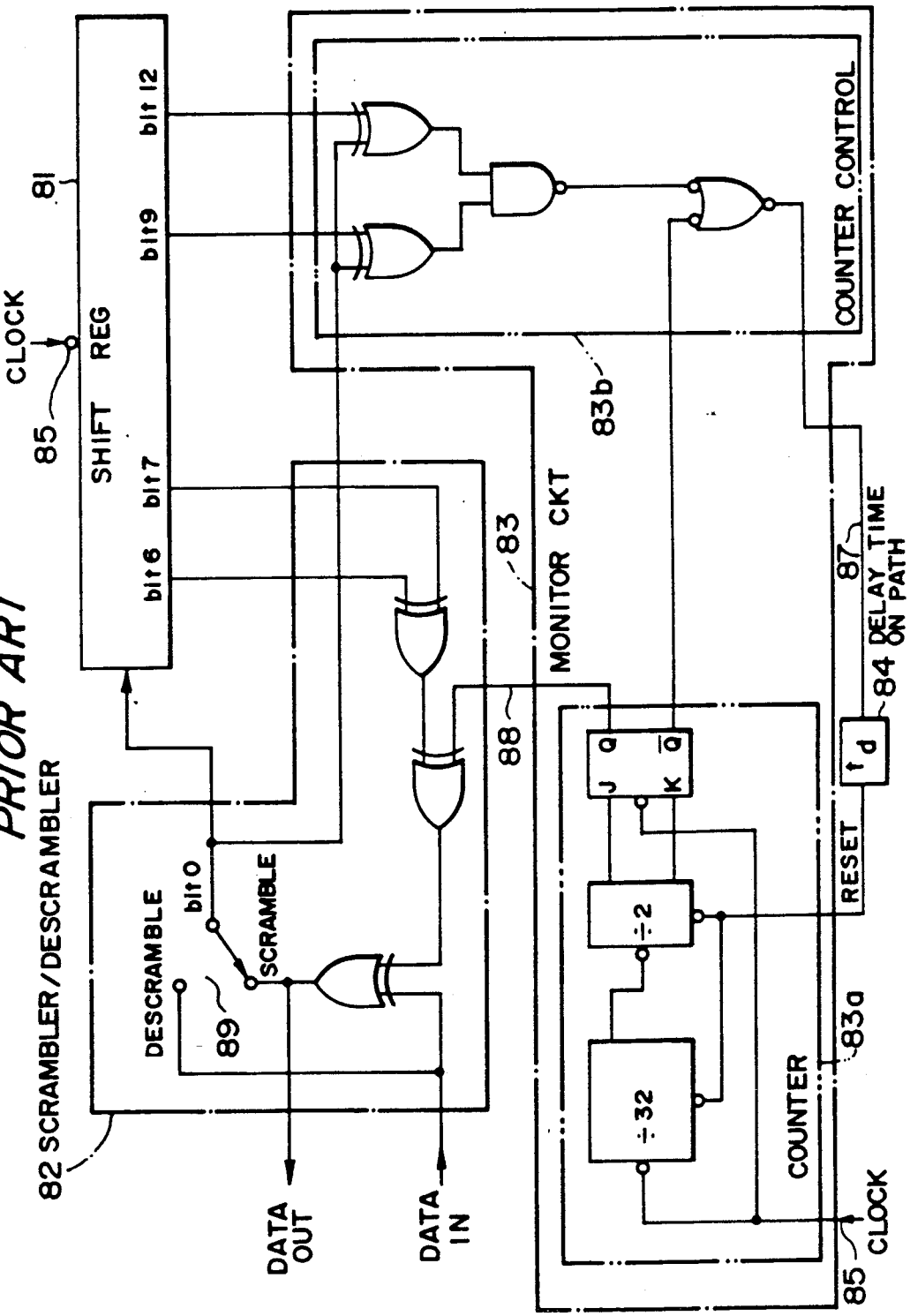
FIG. 5 shows a prior art scrambler/descrambler schematically.

To better understand the present invention, a brief reference will be made to a prior art scrambler/descrambler, shown in FIG. 5. As shown, the prior art scrambler/descrambler is basically made up of a shift register 81, a scrambler/descrambler circuit 82, and a monitor circuit 83. The monitor circuit 83 has a counter 83a and a counter control 83b for controlling the counter 83a. The counter control 83b produces a control output 87 and feeds it to the counter 83a as a signal for resetting the latter. The control output or reset signal 87 is delayed on the propagation path by a time td which is represented by the reference numeral 84 in the figure. A clock generator, not shown, feeds a stepping clock 85 to the counter 83a. The clock generator may be implemented by an oscillator and a frequency divider, for example.

The counter 83a delivers an output 88 thereof to the scrambler/descrambler circuit 82. The scrambler/descrambler circuit 82 has a switch 89 in an output circuit thereof which is connected to the shift register 81. The switch 89 plays the role of a selector for selecting either one of scrambling and descrambling functions which are assigned to the scrambler/descrambler. Specifically, the switch 89 is connected to the scrambling side when the scrambler/descrambler functions in association with the transmitter of a modem or to the descrambling side when the latter functions in association with the receiver.

The shift register 81 and scrambler/descrambler circuit 82 cooperate to produce a random code having a period of 127 bits or decode it by using a generating polynomial $1+x^{-6}+x^{-7}$. The monitor circuit 83 serves as a protection circuit for preventing codes having relatively short periods ascribable to the nature of the generating polynomial from occurring continuously without being randomized. Specifically, the monitor circuit 83 inverts the output bits of the scrambler/descrambler circuit 82 when codes whose periods extend to one-bit, three-bit and nine-bit periods occur over the period of 45 consecutive bits and when codes having periods of two bits, four bits, six bits and twelve bits occur over the period of 45 consecutive bits, collateral with the ninth and twelfth bit positions of the shift register 81.

Figure 1:
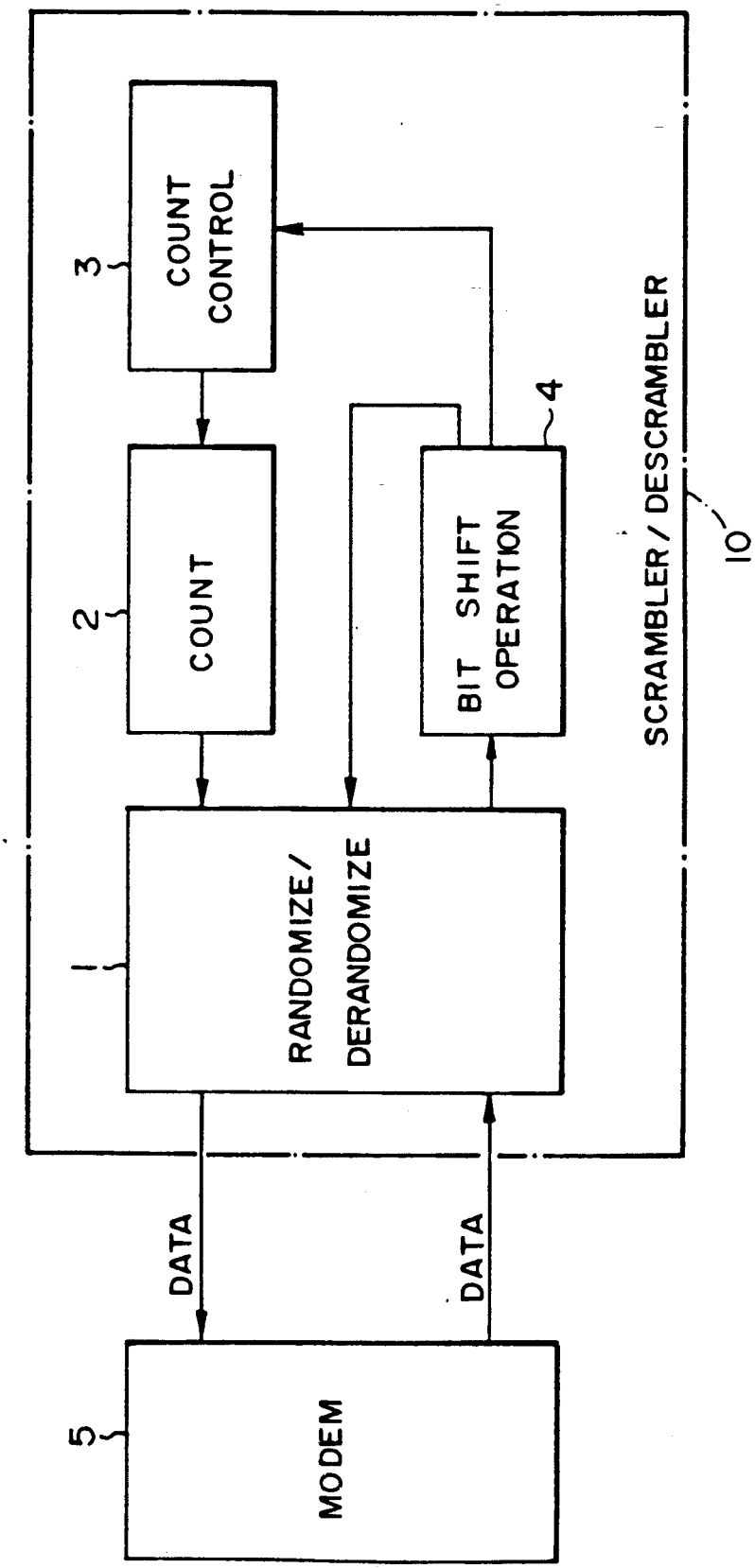
FIG. 1 is a block diagram schematically showing a preferred embodiment of the scrambler/descrambler in accordance with the present invention.

Referring to FIG. 1, a scrambler/descrambler embodying the present invention is shown and generally designated by the reference numeral 10. The scrambler/descrambler 10 is shown as having a randomizing/derandomizing section 1, a count processing section 2, a count controlling section 3, and a bit shift operating section 4. When the scrambler/descrambler 10 functions as a scrambler, the randomizing/derandomizing section 1 selects the same data as the data which should be outputted to a modem 5. When the scrambler/descrambler 10 serves as a descrambler, the randomizing/derandomizing section 1 selects data sent from the modem 5 and delivers them to the bit shift operating section 4. In response, the bit shift operating section 4 performs a one-bit shift operation processing with the incoming data. The randomizing/derandomizing section 1 randomizes or derandomizes data by using the generating polynomial $1+x^{-6}+x^{-7}$ and based on the values of predetermined bits, e.g., the sixth and seventh bits of data which are representative of the result of the shift operation processing as well as the data fed from the modem 5. The randomized or derandomized data are delivered to the modem 5. The count processing section 2 updates a numerical value stored in a data memory 32 which will be described with reference to FIG. 3, either by incrementing it or by decrementing it. Also, based on the content of the numerical value, the count processing section 2 performs a carrying operation, i.e., turns a bit invert flag q stored in the data memory 32 to TRUE or FALSE. The bit invert flag q is adapted to command the inversion of a bit. When data of the bit invert flag q has a predetermined value such as TRUE, the randomizing/derandomizing section 1 inverts the bit of data to be sent to the modem 5. The count controlling section 3 resets the above-stated numerical value, i.e., replaces it with an initial value when none of the predetermined bits of the data representative of the result of the bit shift operation such as the eighth, ninth and twelfth bits coincides with a bit db to be applied to the bit shift operating section 4 next, i.e., the zero-th bit or when the value of the bit invert flag q is TRUE.

By the various sections each serving a different function as described above, data which the modem 5 receives and delivers are scrambled or descrambled. Further codes having relatively short periods ascribable to the nature of the generating polynomial are prevented from occurring continuously without being randomized.

Figure 3:
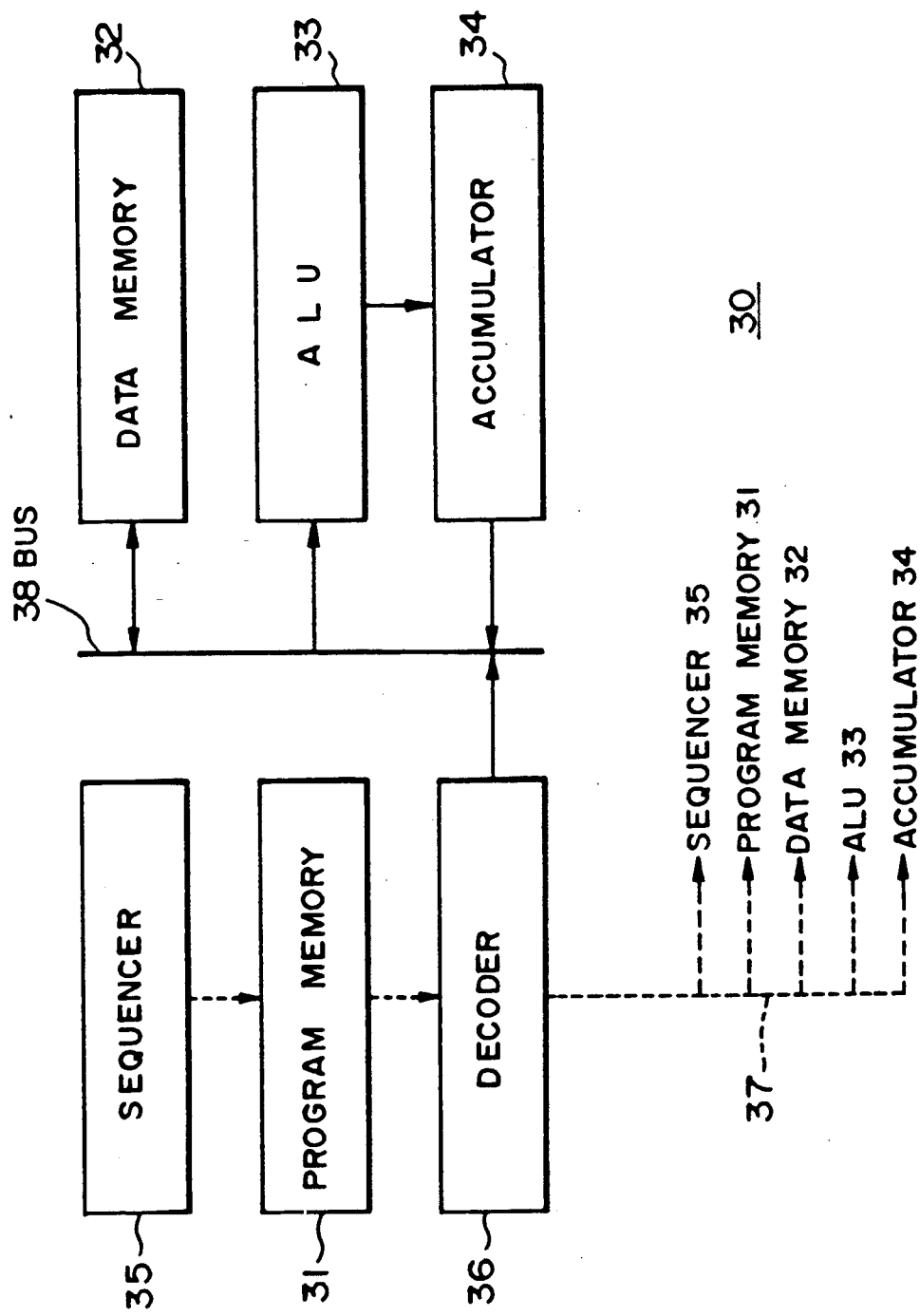
FIG. 3 is a schematic block diagram showing a specific construction of a processor which implements the illustrative embodiment.

Referring to FIGS. 2A through 2C, 3 and 4A through 4E, specific operations of the count controlling section 3 shown in FIG. 1 will be described in detail. Specifically, FIGS. 2A through 2C each demonstrates a specific operation of the count controlling section 3 in a flowchart, FIG. 3 shows a processor 30 in a schematic block diagram, and FIGS. 4A through 4E show bit sequences each appearing in a different processing stage. In the illustrative embodiment, it is assumed that a data word has a bit length of sixteen bits, and that the processor 30 executes count control processing.

The count control section 3 is advantageously implemented by the processor 30. As shown in FIG. 3, the processor 30 has a program memory 31 loaded with programs, the previously mentioned data memory 32, an arithmetic and logical unit (ALU) 33 adapted for arithmetic and logical operations, an accumulator 34 for holding the result of operations performed by the ALU 33, a sequencer 35, and a decoder 36. A control signal path 37 extending out from the decoder 36 is connected to the circuits 31 to 35, as indicated by dotted lines in the figure. The data memory 32, ALU 33, accumulator 34 and decoder 36 are connected to a bus 38, as illustrated.

The sequencer 35 controls the address of the program memory 31 by way of the control signal path 37. Instructions stored in a particular storage location which is designated by the sequencer 35 are read out and fed to the decoder 36. The decoder 36 transforms the content of the program memory 31 into a control signal or into a control signal and data so as to control the operations of the program memory 31, data memory 32, ALU 33, accumulator 34 and sequencer 35 while, when the control signal is accompanied by data, transferring the data to the data memory 32 and ALU 33. The interchange of data among the data memory 32, ALU 33, accumulator 34 and decoder 36 are implemented by the bus 38.

A specific operation of the count controlling section 3 will be described with reference to FIG. 2A. As shown, the count controlling section 3 selects a data word dw0 when the data bit db inputted to the bit shift operating section 4 next is a (logical) ZERO, while selecting a data word dw1 when the data bit db is a (logical) ONE (steps 21 and 22). More specifically, the count controlling section 3 transfers to the accumulator 34 a data word dw0 shown in FIG. 4A which is stored in the data memory 32, FIG. 3, while transferring the data bit db to the ALU 33. Then, the data bit db is evaluated. If the evaluated data bit db is a ONE, a data word dw1 shown in FIG. 4B and also stored in the data memory 32 is transferred to the accumulator 34 so as to replace the existing data word dw0. If the evaluated data bit db is a ZERO, the dta word dw0 having been transferred to the accumulator 34 is not replaced. In FIGS. 4A and 4B, the symbol "*" indicates any desired or wild value.

Subsequently, either the data word dw0 or the data word dw1 which has been selected as stated above, a data word sr which will be described, and the data word dw1 are Exclusive-ORed (step 23). More specifically, the data word dw0 or dw1 held in the accumulator 34 and a data word sr representative of the result of operation of the bit shift operating section 4, FIG. 1, are Exclusive-ORed, and the result is written to the accumulator 34. Then, the Exclusive-OR result held in the accumulator 34 and the data word dw1 stored in the data memory 32 are Exclusive-ORed, and the result a1 is written to the accumulator 34. The Exclusive-OR result a1 is shown in FIG. 4C.

The Exclusive-OR operation is followed by a masking operation (step 24). The masking operation is such that among the data bits of the Exclusive-OR result a1, only the data bits at the eighth, ninth and twelfth bit positions are validated while the other data bits are invalidated. More specifically, a mask pattern Mask shown in FIG. 4D is stored in the data memory 32 beforehand. The result of operation a1 lodged in the accumulator 34 and the mask pattern Mask are ANDed, and the result, i.e., a data word a2 is written to the accumulator 34. The data word a2 is shown in FIG. 4E and may be logically expressed as:

$$\begin{aligned} a2 &= a208 + a209 + a212 \\ &= a108 + a109 + a112 \\ &= db \oplus b8 \oplus 1 + db \oplus b9 \oplus 1 + db \oplus b12 \oplus 1 \end{aligned}$$

On the other hand, the content of the count control processing may be represented by a logical equation:

$$\text{Reset} = F(b) + q$$

where F (b) is equal to $db \oplus b8 \cdot db \oplus b9 \cdot db \oplus b12$, and q is a data word indicative of the content of the bit invert flag which was derived from a carrying command. A counter is not initialized when Reset is a ZERO and is initialized when Reset is not a ZERO.

$$F(b) = db \oplus b8 \cdot db \oplus b9 \cdot db \oplus b12$$
$$= \overline{db \oplus b8} \cdot \overline{db \oplus b9} \cdot \overline{db \oplus b12}$$
$$= \overline{db \oplus b8} + \overline{db \oplus b9} + \overline{db \oplus b12}$$
$$= \{(db \oplus b12) \cdot 1 + (db \oplus b8) \cdot 0 +$$
$$(db \oplus b9) \cdot 1 + (db \oplus b9) \cdot 0 +$$
$$(db \oplus b12) \cdot 1 + (db \oplus b12) \cdot 0)\}$$
$$= db \oplus b8 \oplus 1 + db \oplus b9 \oplus 1 + db \oplus b12 \oplus 1$$

Therefore, $$F(b) = \overline{a2}$$

It will be seen from the above that the count control processing up to the generation of the item F (b) is completed by the procedure described so far, i.e. by the masking step 24, FIG. 2A, and preceding processing. In the logical operations shown above, ORing, ANDing and Exclusive-ORing are represented by "+", "·" and "⊕", respectively, while the eighth, ninth and twelfth bits of the data word sr are represented by "b8", "b9" and "b12", respectively.

After the masking processing 24, the content of the data word a2 which is representative of the result of operation and the content of the bit invert flag data q stored in the data memory 32 are evaluated (step 25). Then, the content of the data memory 32 to be updated is replaced with the initial value (step S26). More specifically, the content of the data word a2 held in the accumulator 34 is evaluated and, if it is a ZERO, the initial value is set. If the evaluated flag data q is evaluated and, only if it is not a ZERO, the initial value is set.

When a predetermined period of time expires before the setting of the initial value, the bit invert flag data q is turned to TRUE, for example, after the content of the data memory 32 has been incremented or decremented to reach a predetermined value. Then, the randomizing-/derandomizing section 1 inverts the bit of the output data. This is successful in eliminating the continuation of codes having relatively short periods which would otherwise occur during randomization/derandomization.

Another specific operation of the count controlling section 3 will be described with reference to FIG. 2B. As shown, the count controlling section 3 selects a data word dw1 when the data bit db inputted to the bit shift operating section 4 next is a ZERO, while selecting a data word dw0 when the data bit db is a ONE (steps 21 and 22, FIG. 2B). More specifically, the count controlling section 3 transfers to the accumulator 34 a data word dw1 shown in FIG. 4B which is stored in the data memory 32, FIG. 3, while transferring the data bit db to the ALU 33. Then, the data bit db is evaluated. If the evaluated data bit db is a ONE, a data word dw0 shown in FIG. 4A and also stored in the data memory 32 is transferred to the accumulator 34 so as to replace the existing data word dw1. If the evaluated data bit db is a ZERO, the data word dw1 having been transferred to the accumulator 34 is not replaced.

Subsequently, either the data word dw0 or the data word dw1 which has been selected as stated above and the data word sr are Exclusive-ORed (step 23, FIG. 2B). More specifically, the data word dw1 or dw0 held in the accumulator 34 and a data word sr representative of the result of operation of the bit shift operating section 4, FIG. 1, are Exclusive-ORed, and the result a1 is written to the accumulator 34. The Exclusive-OR result a1 is shown in FIG. 4C.

The Exclusive-OR operation is followed by a masking operation (step 24, FIG. 2B). The masking operation is such that among the data bits of the Exclusive-OR result a1, only the data bits at the eighth, ninth and twelfth bit positions are validated while the other data bits are invalidated. More specifically, a mask pattern Mask shown in FIG. 4D is stored in the data memory 32 beforehand. The result of operation a1 lodged in the accumulator 34 and the mask pattern Mask are ANDed, and the result, i.e., a data word a2 is written to the accumulator 34. The data word a2 is shown in FIG. 4E and may be logically expressed as:

$$a2 = a208 + a209 + a212$$
$$= a108 + a109 + a112$$
$$= \begin{Bmatrix} b8 \oplus 1 + b9 \oplus 1 + b12 \oplus 1 & (db = 0) \\ b8 \oplus 0 + b9 \oplus 0 + b12 \oplus 0 & (db = 1) \end{Bmatrix}$$

On the other hand, the content of the count control processing may be represented by a logical equation:

$$\text{Reset} = F(b) + q$$

where F(b) is equal to $db \oplus d8 \cdot db \oplus b9 \cdot db \oplus b12$, and q is a data word indicative of the content of the bit invert flag which was derived from a carrying command. A counter is not initialized when Reset is a ZERO and is initialized when Reset is not a ZERO.

However, the term F(b) can be rewritten as:

$$F(b) = db \oplus b8 \cdot db \oplus b9 \cdot db \oplus b12$$
$$= \overline{db \oplus b8} \cdot \overline{db \oplus b9} \cdot \overline{db \oplus b12}$$
$$= \overline{db \oplus b8} + \overline{db \oplus b9} + \overline{db \oplus b12}$$
$$= db \oplus b8 \oplus 1 + db \oplus b9 \oplus 1 + db \oplus b12 \oplus 1$$
$$= \begin{Bmatrix} b8 \oplus 1 + b9 \oplus 1 + b12 \oplus 1 & (db = 0) \\ b8 \oplus 0 + b9 \oplus 0 + b12 \oplus 0 & (db = 1) \end{Bmatrix}$$

Therefore, $$F(b) = \overline{a2}$$

It will be seen from the above that the count control processing up to the generation of the item F(b) is completed by the procedure described so far, i.e. by the masking step 24, FIG. 2B, and proceding processing. Thereafter, the bit invert flag data q is evaluated (step S25, FIG. 2B), and the initial value is set (step S26, FIG. 2B), as in the operation shown in FIG. 2A.

Still another specific operation of the count controlling section 3 will be described with reference to FIG. 2C. As shown, the count controlling section 3 NOTs the data word sr when the data bit db inputted to the bit shift operating section 4, FIG. 1, next is a ZERO, while transferring the data word sr when the data bit db is a ONE (steps 21C, 22C and 23C, FIG. 2C). More specifically, the count controlling section 3 transfers to the accumulator 34, FIG. 3, the data word sr representative of the result of operation of the bit shift operating section 4, FIG. 1, while transferring the data bit db to the ALU 33. Then, the data bit db is evaluated. If the evaluated data bit db is a ZERO, the data word sr stored in the accumulator 34 is NOTed, and the result a1 is written to the accumulator 34. If the evaluated data bit db is a ONE, the data word sr stored in the accumulator 34 is not replaced and used as the NOT result a1. The result a1 is shown in FIG. 4C.

The NOT operation is followed by a masking operation (step 24, FIG. 2C). The masking operation is such that among the data bits of the NOT result a1, only the data bits at the eighth, ninth and twelfth bit positions are validated while the other data bits are invalidated. More specifically, the mask pattern Mask shown in FIG. 4D is stored in the data memory 32 beforehand. The result of operation a1 lodged in the accumulator 34 and the mask pattern Mask are ANDed, and the result, i.e., a data word a2 is written to the accumulator 34. The data word a2 is shown in FIG. 4E and may be logically expressed as:

$$\begin{aligned} a2 &= a208 + a209 + a212 \\ &= a108 + a109 + a112 \\ &= \begin{cases} b8 + b9 + b12 & (db = 0) \\ \overline{b8} + \overline{b9} + \overline{b12} & (db = 1) \end{cases} \end{aligned}$$

On the other hand, the content of the count control processing may be represented by a logical equation:

$$\text{Reset} = F(b) + q$$

where $F(b)$ is equal to $db \oplus d8 \cdot db \oplus b9 \cdot db \oplus b12$, and q is a data word indicative of the content of the bit invert flag which was derived from a carrying command. A counter is not initialized when Reset is a ZERO and is initialized when Reset is not a ZERO.

However, the term F(b) can be rewritten as:

$$\begin{aligned} F(b) &= \overline{db \oplus b8 \cdot db \oplus b9 \cdot db \oplus b12} \\ &= \overline{db \oplus b8} \cdot \overline{db \oplus b9} \cdot \overline{db \oplus b12} \\ &= \overline{db \oplus b8} + \overline{db \oplus b9} + \overline{db \oplus b12} \\ &= db \oplus b8 \oplus 1 + db \oplus b9 \oplus 1 + db \oplus b12 \oplus 1 \\ &= \begin{cases} b8 \oplus 1 + b9 \oplus 1 + b12 \oplus 1 & (db = 0) \\ b8 \oplus 0 + b9 \oplus 0 + b12 \oplus 0 & (db = 1) \end{cases} \\ &= \begin{cases} \overline{b8} + \overline{b9} + \overline{b12} & (db = 0) \\ b8 + b9 + b12 & (db = 1) \end{cases} \end{aligned}$$

Therefore, $$F(b) = \overline{a2}$$

It will be seen from the above that the count control processing up to the generation of the item F(b) is completed by the procedure described so far, i.e. by the masking step 24, FIG. 2C, and preceding processing. Thereafter, the bit invert flag data q is evaluated (step S25, FIG. 2C), as in the previous specific operations of FIGS. 2A and 2B.

In summary, in accordance with the present invention, count control processing is implemented as word-by-word operations not accompanied by bit shift operations and can, therefore, be desirably executed by a processor. More specifically, scrambling/descrambling software can be loaded on a processor with the total amount of programs which describe the scrambling/descrambling software being reduced, i.e., with a minimum of period of time being allocated to scrambling/descrambling operations. It is, therefore, not necessary to provide an arithemetic and logical unit with many kinds of bit shift processing functions. This simplifies the hardware of the processor and reduces the overall amount of hardware. The processor does not need the help of exclusive hardware which would otherwise be required for scrambling/descrambling operations and implemented as a logical circuit. Hence, efficient use of the hardware resource of a processor is promoted to cut down the overall amount of hardware constituting a modem.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A scrambling/descrambling apparatus for scrambling/descrambling input data to produce output data comprising:

storing means for storing a data word, a bit invert flag, and numerical data;

bit shift operating means for performing, on receiving a bit of data to be outputted or a bit of input data, a bit shift operation with said bit and storing resultant data in said storing means in a form of a first data word;

randomizing/derandomizing means for randomizing or derandomizing the input data by using said first data word and based on a generating polynomial and, depending on a state represented by said bit invert flag, inverting said bit of said data to be outputted to develop output data;

count processing means for incrementing or decrementing the numerical value stored in said storing means and, depending on said numerical value, selectively setting said bit invert flag to a predetermined state; and count controlling means for replacing said numerical value with a predetermined initial value on the basis of said first data word and said bit invert flag;

said storing means holding a second and a third data word, bits of which corresponding in position to a particular bit of said first data word are a ZERO and a ONE, respectively;

said count controlling means
   reading selectively either one of said second and third data words out of said storing means depending on the value of said bit which is inputted to said bit shift operating means;

Exclusive-ORing said data word read out and said first data word;

performing a masking operation with a data word resulting from the Exclusive-ORing for validating a bit corresponding in position to said particular bit position of said first data word while invalidating the remaining bits;

replacing said numerical value with said initial value when a data word resulting from the masking operation is indicative of a ZERO or when said bit invert flag is in said predetermined state.

2. An apparatus in accordance with claim 1, wherein said randomizing/derandomizing means inverts said bit of said data to be outputted in response to an indication TRUE of said bit invert flag;

said count processing means setting selectively said bit invert flag to either one of TRUE and FALSE on the basis of said numerical value stored in said storing means;

said count controlling means reading said third and second data words out of said storing means in response to a ZERO and a ONE, respectively, which are inputted to said bit shift operating means, and replacing said numerical value with said initial value when said data word resulting from said masking operation is indicative of ZERO or when said bit invert flag is indicative of TRUE.

3. An apparatus in accordance with claim 1, further comprising an input terminal to be interconnected to a modem of a phase modulation system for receiving the input data from said modem; and
   an output terminal to be interconnected to said modem for delivering the output data to the modem;
   each of said data words having sixteen bits;
   said randomizing/derandomizing means using a generating polynomial $1+x^{-6}+x^{-7}$;
   said count controlling means handling the eighth, ninth and twelfth bit positions of said data words as said predetermined bit position.

4. An apparatus in accordance with claim 1, further comprising a modem for producing input data by demodulating a signal and modulating output data by a phase modulation system.

5. A scrambler for scrambling input data to produce output data, comprising:
   storing means for storing a data word, a bit invert flag, and numerical data;
   bit shift operating means for performing, on receiving a bit of data to be outputted, a bit shift operation with said bit and storing resultant data in said storing means in a form of a first data word;
   randomizing means for randomizing input data by using said first data word and based on a generating polynomial and, depending on a state represented by said bit invert flag, inverting said bit of said data to be outputted to develop output data;
   count processing means for incrementing or decrementing the numerical value stored in said storing means and, depending on said numerical value, selectively setting said bit invert flag to a predetermined state; and
   count controlling means for replacing said numerical value with a predetermined initial value on the basis of said first data word and said bit invert flag;
   said storing means holding a second and a third data word, bits of which corresponding in position to a particular bit of said first data word are a ZERO and a ONE, respectively;
   said count controlling means
   reading selectively either one of said second and third data words out of said storing means in association with the value of said bit which is inputted to said bit shift operating means;
   Exclusive-ORing said data word and said first data word;
   performing a masking operation with a data word resulting from the Exclusive-ORing for validating a bit corresponding in position to said particular bit position of said first data word while invalidating the remaining bits;
   replacing said numerical value with said initial value when a data word resulting from the masking operation is indicative of a ZERO or when said bit invert flag is in said predetermined state.

6. A scrambler in accordance with claim 5, wherein said randomizing means inverts said bit of said data to be outputted in response to an indication TRUE of said bit invert flag;
   said count processing means selectively setting said bit invert flag to either one of TRUE and FALSE on the basis of said numerical value stored in said storing means;
   said count controlling means reading said third and second data words out of said storing means in response to a ZERO and a ONE, respectively, which are inputted to said bit shift operating means, and replacing said numerical value with said initial value when said data word resulting from the masking operation is indicative of a ZERO or when said bit invert flag is TRUE.

7. A scrambler in accordance with claim 5, further comprising:
   an input terminal to be connected to a modulator of a phase modulation system for receiving input data from said modulator; and
   an output terminal to be connected to said modulator for delivering output data to said modulator;
   each of said data words having sixteen bits;
   said randomizing means using a generating polynomial $1+x^{-6}+x^{-7}$;
   said count controlling means handling the eighth, ninth and twelfth bit positions of said data words as said predetermined bit position.

8. A scrambler in accordance with claim 1, further comprising a modulator for producing input data by modulating output data by a phase modulation system.

9. A descrambler for descrambling input data to produce output data comprising: storing means for storing a data word, a bit invert flag, and numerical data;
   bit shift operating means for performing, on receiving a bit of input data, a bit shift operation with said bit and storing resultant data in said storing means in a form of a first data word;
   derandomizing means for derandomizing the input data by using said first data word and based on a generating polynomial and, depending on a state represented by said bit invert flag, inverting a bit of data to be outputted to develop output data;
   count processing means for incrementing or decrementing the numerical value stored in said storing means and, depending on said numerical value, selectively setting said bit invert flag to a predetermined state; and
   count controlling means for replacing said numerical value with a predetermined initial value on the basis of said first data word and said bit invert flag;
   said storing means holding a second and a third data word, bits of which corresponding in position to a particular bit of said first data word are a ZERO and a ONE, respectively;
   said count controlling means
   reading selectively either one of said second and third data words out of said storing means in association with the value of said bit which is inputted to said bit shift operating means;
   Exclusive-ORing said data word and said first data word;
   performing a masking operation with a data word resulting from the Exclusive-ORing for validating a bit corresponding in position to said particular bit position of said first data word while invalidating the remaining bits;
   replacing said numerical value with said initial value when a data word resulting from the masking operation is indicative of a ZERO or when said bit invert flag is in said predetermined state.

10. A descrambler in accordance with claim 9, wherein said derandomizing means inverts said bit of said data to be outputted in response to an indication TRUE of said bit invert flag;

said count processing means setting selectively said bit invert flag to either one of TRUE and FALSE on the basis of said numerical value stored in said storing means;

said count controlling means reading said third and second data words out of said storing means in response to a ZERO and a ONE, respectively, which are inputted to said bit shift operating means, and replacing said numerical value with said initial value when said data word resulting from the masking operation is indicative of a ZERO or when said bit invert flag is indicative of TRUE.

11. A descrambler in accordance with claim 9, further comprising:

an input terminal connected to a demodulator of a phase modulation system for receiving input data from said demodulator; and an output terminal to be connected to said demodulator for delivering output data to said demodulator;

each of said data words having sixteen bits;

said derandomizing means using a generating polynomial $1+x^{-6}+x^{-7}$;

said count controlling means handling the eighth, ninth and twelfth bit positions of said data words as said predetermined bit position.

12. A descrambler in accordance with claim 9, further comprising a demodulator for producing input data by demodulating output data by a phase modulation system.

13. A scrambling/descrambling apparatus for scrambling/descrambling input data to produce output data, comprising:

storing means for storing a data word, a bit invert flag, and numerical data;

bit shift operating means for performing, on receiving a bit of data to be outputted or a bit of input data, a bit shift operation with said bit and storing resultant data in said storing means in a form of a first data word;

randomizing/derandomizing means for randomizing or derandomizing the input data by using said first data word and based on a generating polynomial and, depending on a state represented by said bit invert flag, inverting said bit of said data to be outputted to develop output data;

count processing means for incrementing or decrementing the numerical value stored in said storing means and, depending on said numerical value, selectively setting said bit invert flag to a predetermined state; and count controlling means for replacing said numerical value with a predetermined initial value on the basis of said first data word and said bit invert flag;

said storing means holding said first data word;

said count controlling means reading said first data word out of said storing means and, depending on the value of said bit which is inputted to said bit shift operating means, NOTing or transferring said first data word;

performing a masking operation with a data word representative of a result of said NOTing or said transfer for validating a bit corresponding in position to said particular bit position of said first data word while invalidating the remaining bits;

replacing said numerical value with said initial value when a data word resulting from said masking operation is indicative of a ZERO or when said bit invert flag is in said predetermined state.

14. An apparatus in accordance with claim 13, wherein said randomizing/derandomizing means inverts said bit of said data to be outputted in response to an indication TRUE of said bit invert flag;

said count processing means setting selectively said bit invert flag to either one of TRUE and FALSE on the basis of said numerical value stored in said storing means;

said count controlling means reading said first data word out of said storing means and, in response to a ZERO and a ONE, respectively, which are inputted to said bit shift operating means, NOTing said first data word and transferring said first data word;

replacing said numerical value with said intial value when a data word representative of a result of said masking operation is indicative of a ZERO or when said bit invert flag is TRUE.

15. An apparatus in accordance with claim 13, further comprising an input terminal to be interconnected to a modem of a phase modulation system for receiving the input data from said modem; and an output terminal to be interconnected to said modem for delivering the output data to the modem;

each of said data words having sixteen bits;

said randomizing/derandomizing means using a generating polynomial $1+x^{-6}+x^{-7}$;

said count controlling means handling the eighth, ninth and twelfth bit positions of said data words as said predetermined bit position.

16. An apparatus in accordance with claim 13, Characterized BY a modem (5) for producing input data by demodulating a signal and modulating output data by a phase modulation system.

17. A scrambler for scrambling input data to produce output data, comprising:

storing means for storing a data word, a bit invert flag, and numerical data;

bit shift operating means for performing, on receiving a bit of data to be outputted, a bit shift operation with said bit and storing resultant data in said storing means in a form of a first data word;

randomizing means for randomizing input data by using said first data word and based on a generating polynomial and, depending on a state represented by said bit invert flag, inverting said bit of said data to be outputted to develop output data;

count processing means for incrementing or decrementing the numerical value stored in said storing means and, depending on said numerical value, selectively setting said bit invert flag to a predetermined state; and count controlling means for replacing said numerical value with a predetermined initial value on the basis of said first data word and said bit invert flag;

said storing means holding said first data word;

said count controlling means reading said first data word out of said storing means and, depending on the value of said bit which is inputted to said bit shift operating means, NOTing or transferring said first data word;

performing a masking operation with a data word representative of a result of said NOTing or said transfer for validating a bit corresponding in position to said particular bit position of said first data word while invalidating the remaining bits;

replacing said numerical value with said initial value when a data word resulting from the masking operation is indicative of a ZERO or when said bit invert flag is in said predetermined state.

18. A scrambler in accordance with claim 17, wherein said randomizing means inverts said bit of said data to be outputted in response to an indication TRUE of said bit invert flag;

said count processing means selectively setting said bit invert flag to either one of TRUE and FALSE on the basis of said numerical value stored in said storing means;

said count controlling means reading said first data word out of said storing means and, in response to a ZERO and a ONE, respectively, which are inputted to said bit shift operating means, NOTing said first data word and transferring said first data word;

replacing said numerical value with said initial value when said data word representative of a result of said masking operation is indicative of a ZERO or when said bit invert flag is TRUE.

19. A scrambler in accordance with claim 17, further comprising:

an input terminal to be connected to a modulator of a phase modulation system for receiving input data from said modulator; and an output terminal to be connected to said modulator for delivering output data to said modulator;

each of said data words having sixteen bits;

said randomizing means using a generating polynomial $1+x^{-6}+x^{-7}$;

said count controlling means handling the eighth, ninth and twelfth bit positions of said data words as said predetermined bit position.

20. A scrambler in accordance with claim 17, further comprising a modulator for producing input data by modulating output data by a phase modulation system.

21. A descrambler for descrambling input data to produce output data, comprising:

storing means for storing a data word, a bit invert flag, and numerical data;

bit shift operating means for performing, on receiving a bit of input data, a bit shift operation with said bit and storing resultant data in said storing means in a form of a first data word;

derandomizing means for derandomizing the input data by using said first data word and based on a generating polynomial and, depending on a state represented by said bit invert flag, inverting a bit of data to be outputted to develop output data;

count processing means for incrementing or decrementing the numerical value stored in said storing means and, depending on said numerical value, selectively setting said bit invert flag to a predetermined state; and count controlling means for replacing said numerical value with a predetermined initial value on the basis of said first data word and said bit invert flag;

said storing means holding said first data word;

said count controlling means reading said first data word out of said storing means and, depending on the value of said bit which is inputted to said bit shift operating means, NOTing or transferring said first data word;

performing a masking operation with a data word representative of a result of said NOTing or said transfer for validating a bit corresponding in position to said particular bit position of said first data word while invalidating the remaining bits;

replacing said numerical value with said initial value when a data word resulting from the masking operation is indicative of a ZERO or when said bit invert flag is in said predetermined state.

22. A descrambler in accordance with claim 21, wherein said derandomizing means inverts said bit of said data to be outputted in response to an indication TRUE of said bit invert flag;

said count processing means setting selectively said bit invert flag to either one of TRUE and FALSE on the basis of said numerical value stored in said storing means;

said count controlling means reading said first data word out of said storing means and, in response to a ZERO and a ONE, respectively, which are inputted to said bit shift operating means, NOTing said first data word and transferring said data word;

replacing said numerical value with said initial value when a data word representative of a result of said masking operation is indicative of a ZERO or when said bit invert flag is TRUE.

23. A descrambler in accordance with claim 21, further comprising:

an input terminal connected to a demodulator of a phase modulation system for receiving input data from said demodulator; and an output terminal to be connected to said demodulator for delivering output data to said demodulator;

each of said data words having sixteen bits;

said derandomizing means using a generating polynomial $1+x^{-6}+x^{-7}$;

said count controlling means handling the eighth, ninth and twelfth bit positions of said data words as said predetermined bit position.

24. A descrambler in accordance with claim 21, further comprising a demodulator for producing input data by demodulating output data by a phase modulation system.

* * * * *